Dec. 23, 1941.  R. R. ROBERTSON  2,267,220
ROAD JOINT
Filed Feb. 10, 1940  2 Sheets-Sheet 2
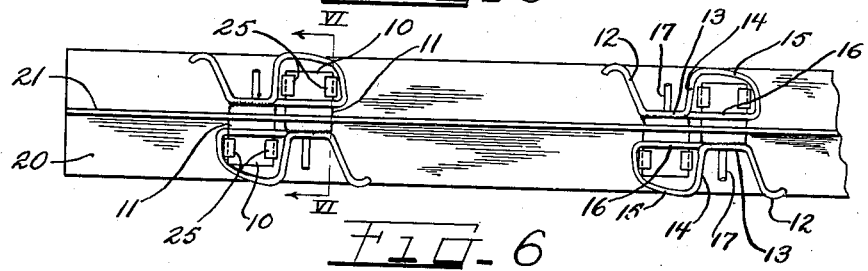
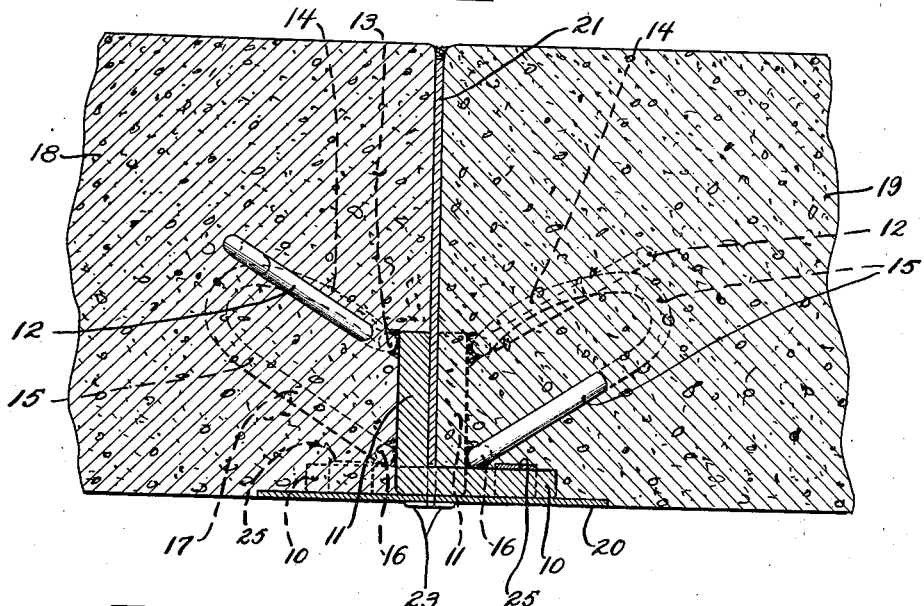
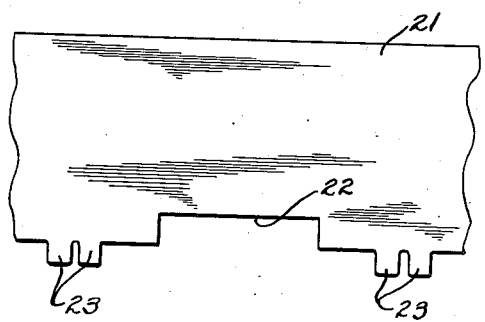
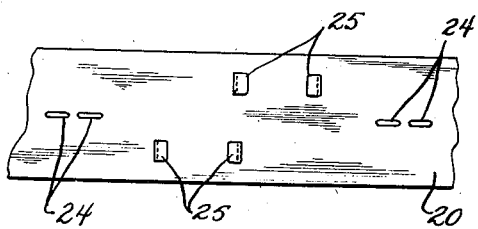
Inventor
Robert R. Robertson Patented Dec. 23, 1941

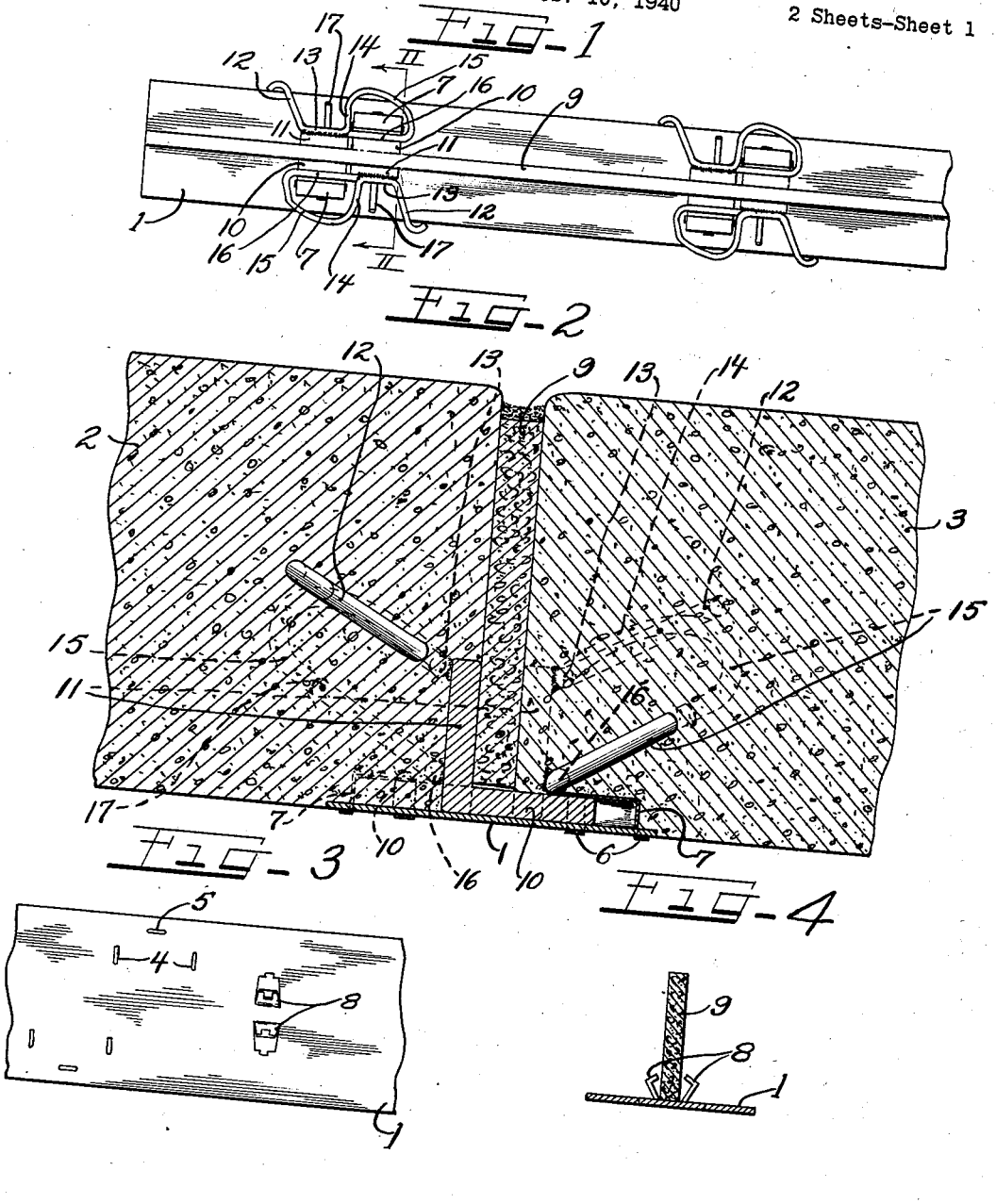

2,267,220

UNITED STATES PATENT OFFICE 2,267,220

ROAD JOINT

Robert R. Robertson, Chicago, Ill., assignor to Highway Steel Products Company, Chicago Heights, Ill., a corporation of Illinois Application February 10, 1940, Serial No. 318,218

6 Claims. (Cl. 94—18)

The present invention pertains to transverse road joints, and more particularly to load distributing expansion and contraction joints including long or continuous base plates engaged beneath and supporting upright joint fillers or plates secured directly to one another. The upright fillers or plates have the lower margins thereof notched out to engage over spaced pairs of reversed load transmission units including improved anchoring means comprising upper and lower anchoring arms and a looped anchoring extension extending from one of the load transmission members above a portion of the adjacent load transmission member to assist in holding the same in position.

It is an object of this invention to provide improved transverse expansion and contraction joints including long or continuous base plates positioned beneath upright joint fillers or dividing plates and rigidly secured thereto to hold the joint fillers or dividing plates in position between concrete road slabs.

Another object of the invention is the provision of a load transmission road joint including a base plate and an upright plate rigidly secured to one another and constructed for the reception of groups or pairs of load transmission angle units.

It is also an object of this invention to provide an improved type of road joint including a base plate having an upright plate rigidly secured thereto for separating road slabs, said plates having load transmission units slidably engaged therewith and provided with improved upper and lower anchoring arms and a looped connecting portion positioned to coact with an adjacent load transmission member to serve as a guide therefor.

Another object of the invention is to provide a road joint construction wherein horizontally and vertically connected joint plates serve as supports and guides for a plurality of reversed and staggered load transmission units, each of which consists of an angle member having secured thereon a plurality of anchoring arms positioned at different elevations, with two of said arms integrally connected to form a guide for projecting transversely over an adjacent angle member to serve as a guide therefor and as a means for more efficiently anchoring the load transmission units in the opposite road slab to produce a structure in which the areas around the joint are greatly strengthened in that any cracking tendencies in the road slab will occur farther away from the joint or will be entirely eliminated.

It is an important object of this invention to provide an improved type of either a transverse expansion joint or a transverse contraction joint wherein the horizontal and vertical joint plates are provided with means for rigidly securing said plates together at substantially right angles to provide suitable supports and guides for a plurality of sets or pairs of load transmission units, each of which is provided with improved upper and lower anchoring members which are connected together to provide anchoring loops and guides to increase the efficiency of the joints and to move the cracking areas, if any, farther away from the joints.

Other and further important objects of this invention will be apparent from the disclosures in the specification and the accompanying drawings.

On the drawings:

Figure 1 is a fragmentary top plan view of an expansion joint embodying the principles of this invention and disclosing a continuous base and filler rigidly secured together, and a plurality of spaced sets of load transmitting units coacting with the base and filler and provided with improved anchoring members.

Figure 2 is an enlarged vertical detail section taken on the line II—II of Figure 1, showing the joint embedded between concrete road slabs.

Figure 3 is a fragmentary top plan view of the joint base plate showing the apertures for securing the load transmission housings or pockets in place and also showing securing clamps for engagement with the vertical filler of the joint.

Figure 4 is a transverse vertical detail section through the joint base plate and the upright filler and illustrating the position of the clamping members of the base plate before being bent into gripper engagement with the filler.

Figure 5 is a fragmentary top plan view of a contraction joint also embodying the principles of this invention and disclosing a continuous base and upright dividing plate rigidly secured thereto, with said base and upright plate serving as a support and guide for a plurality of improved load transmission units.

Figure 6 is an enlarged vertical detail section taken on the line VI—VI of Figure 5, showing the joint embedded in concrete road slabs.

Figure 7 is a fragmentary side elevation of the contraction joint center plate notched out and provided with attaching lugs or extensions for mounting the plate on a joint base.

Figure 8 is a fragmentary top plan view of the contraction joint base plate showing the location of the apertures for receiving the lugs of the upright joint plate and also showing the location of guide members for the load transmission units.

As shown on the drawings:

Figures 1 to 4 of the drawings illustrate an improved transverse expansion joint wherein the filler and base plate are rigidly secured together and afford supports and guides for the load transmission units. The reference numeral 1 indicates a long or continuous metal base plate adapted to be mounted on a road sub-grade transversely of the road and extending from the outer edge of the road to the center joint. As clearly illustrated in Figure 2, the improved expansion joint is embedded between concrete road slabs 2 and 3 and above the sub-grade.

The base plate 1 is provided at spaced intervals with staggered sets of slots 4 and 5, through which the side and end lugs 6 of a plurality of sets or pairs of metal housings or pockets 7 project. The lugs 6 are bent over beneath the base plate 1 for holding said housings or pockets in reversed staggered relationship on the base plate, as illustrated in Figure 1. Struck upwardly at spaced intervals along the middle portion of the base plate 1 are a plurality of oppositely positioned pairs of grips or clamps 8, the upper ends of which are formed with fingers or teeth adapted to be hammered or forced into the sides of the lower margin of an upright joint core or filler board 9 which is seated on the base plate 1 at substantially right angles thereto along the middle line thereof and extending throughout the length of the base plate. The base plate 1 and upright filler 9 are thus rigidly secured to one another, with the lower edge of the filler resting upon the top surface of the base plate. For a purpose hereinafter described, the lower edge of the core or filler board 9 is cut out at spaced intervals to provide notches to receive the base flanges 10 of angle-shaped anchoring shoes forming part of the load transmission units.

As illustrated in Figures 1 and 2, the housings or pockets 7 are arranged in staggered or offset pairs upon the base plate 1 and have the entrance openings thereto positioned on the inner ends thereof for the reception of the base flanges 10 of the angled load transmission anchoring shoes. Integrally formed on each of the base flanges 10 is an upright flange 11. The base flange 10 of each anchoring shoe seats on the base plate 1 and has the outer end thereof slidably projecting into one of the housings or pockets 7. Each pair of angle shoes is arranged in reversed staggered relation with respect to one another, so that the adjacent sides of a pair of angle shoes are in frictional sliding contact with one another with the upright flanges 11 positioned on opposite sides of the lower portion of the filler board 9, while the base flanges of the angle members project through the notches provided in the lower margin of said filler board.

As clearly illustrated in Figures 1 and 2, portions of the upper surfaces of each of the base flanges of the angle members are exposed. For the purpose of anchoring the load transmission angle shoes in the opposite road slabs 2 and 3, each of the angled shoes is provided with an improved anchoring means which serves not only as an anchoring means for the angled shoe but is so constructed that a portion thereof acts as a guide and retaining means for the adjacent angle shoe.

Brazed or otherwise rigidly secured to the upper margin of the outer face of each of the angle shoe upright flanges 11 is an anchoring means constructed out of a steel rod bent and looped into shape to provide an upper hook-shaped arm 12, the lower end of which is integral with a supporting section 13 which is brazed or otherwise rigidly secured to the upper marginal portion of the angle shoe flange 11. Integrally formed with the second end of the supporting section 13 is a second upper anchoring arm 14, the outer end of which merges into and is integral with an anchoring loop 15 which projects beyond the side of the anchoring shoe to which it is attached and extends downwardly at an angle over an adjacent anchoring shoe base flange 10. The lower end of the anchoring loop 15 terminates at one end in a base section 16 of the anchoring means.

The lower base section 16 of the anchoring means is in the form of an arm which projects over the top surface of the base flange 10 of an adjacent angle shoe and then projects adjacent the lower end of the upright flange 11 of the angle shoe of which it forms a part. The portion 16 of the lower anchoring loop 15 is brazed or rigidly secured by other suitable means to the upright flange 11 of the anchor shoe. The end of the anchor section 16 is bent outwardly and upwardly at an angle to form a lower anchoring arm 17.

It will thus be noted that the anchoring means for each of the angle shoes consists of two upper anchoring arms, a lower anchoring arm, an anchoring loop, and upper and lower mounting sections which are secured rigidly to the upright flange of the anchoring shoe with a portion of the lower anchoring section and the lower portion of the anchoring loop 15 extending to one side to project over an adjacent base flange of another angle shoe reversed with respect to the anchor shoe to which the anchoring means is secured.

As clearly illustrated in Figure 1, the groups of load transmission joints are spaced along the length of the joint and are supported upon the base plate 1 in reverse staggered relationship so that the base flanges of the anchoring shoes project in opposite directions through the notches provided in the lower margins of the upright filler board 9. It will thus be noted that the upright flanges 11 of the two anchor shoes are positioned on opposite sides of the filler board 9 (Figure 2), so that the anchoring means of the two shoes comprising the anchoring unit are adapted to be embedded in the concrete forming the road slabs 2 and 3.

By providing each of the anchoring shoes with a multiple type of anchoring means consisting of the upper anchoring arms and lower anchoring arm, together with the anchoring loop, an anchoring means is provided which will not only tend to increase the efficiency of load transmission from one road slab into another, but also serves as an improved means for reinforcing the road slab a greater distance back into the slab from the joint so that any cracking tendency in the road slab is moved farther inwardly away from the joint or the cracking may be entirely eliminated.

Figures 6 to 8, inclusive, of the drawings are directed to illustrate a transverse contraction joint, with Figure 6 illustrating the joint embedded between concrete road slabs 18 and 19. In the contraction joint, the load transmission units are the same as those illustrated in Figures 1 and 2, with corresponding parts numbered accordingly.

The improved load transmission units are arranged in groups of two with the load transmission units reversed with respect to one another to project through the joint from opposite directions over the base plate 20 and through the upright joint dividing plate 21. The joint dividing plate 21 is preferably of a continuous length extending from the outer edge of the road up to the center joint of the road. The lower marginal edge of the dividing plate 21 is provided with spaced openings or notches 22 of a size sufficient to permit two adjacently positioned reversed load transmission anchoring shoe base flanges 10 to project therethrough in opposite directions. Integrally formed on the lower edge of the dividing plate 21 on opposite sides of the respective notches 22 are pairs of fingers or retaining lugs 23 which are so positioned and spaced that they will project downwardly through pairs of slots 24 provided along a center line of the base plate 20, as clearly illustrated in Figure 8. This arrangement provides a means whereby the upright dividing plate 21 of the joint may be rigidly secured to the base plate 20.

For the purpose of providing guides for the load transmission shoes, hook-shaped or angled retaining fingers or lugs 25 are struck upwardly in pairs from the base plate 20. As illustrated in Figure 8, the sets of retaining lugs 25 are arranged in offset groups on opposite sides of the center line of the base plate 20 for the purpose of receiving the base flanges 10 of the load transmission shoes therein, as clearly illustrated in Figures 5 and 6.

One of the principal features of the present invention is the provision of either an expansion road joint or a contraction road joint wherein the main body of the joint comprises a base plate having an upright member, such as a filler board or a dividing plate rigidly secured thereto and arranged to support and receive a plurality of pairs of load transmission units in proper spaced relationship throughout the length of the joint.

Another important feature of the invention is the provision of improved load transmission units, wherein the anchoring means which is secured to the upright flange of each of the angle members forming a part of the units is of an improved character and form. Each of the anchoring means provides a plurality of upper and lower anchoring arms or extensions in addition to an anchoring loop, with said various upper and lower arms and loop all integrally connected to one another. Each of the improved anchoring means is also adapted to serve as a guide and a retainer for an adjacent anchoring shoe which has the base flange 10 thereof positioned to slide under the lower guide section 16 which connects the anchoring loop with the lower anchoring arm. The improved anchoring means are thus shaped to provide a reinforcing means as well as an anchoring means so that the cracking tendency of a road slab is moved farther away from a joint or, in many cases, is entirely eliminated.

It will, of course, be understood that numerous details of construction may be varied through a wide range without departing from the principles of this invention, and it is therefore not the purpose to limit the patent granted hereon otherwise than necessitated by the scope of the appended claims.

I claim as my invention:

1. In a road construction comprising a pair of concrete road slabs having spaced opposed faces defining a joint void, a joint base plate beneath the road slabs and projecting across the bottom of the void between the slabs, an upright dividing member rigidly secured to said base plate and positioned in the void between the road slabs, said upright member having a plurality of spaced openings in the lower margin thereof, pairs of reversed load transmission angle shoes seated on said base plate and projecting in opposite directions through the openings in said upright member, and connected upper and lower anchoring members on one side only of each of the load transmission angle shoes and embedded in the concrete road slabs.

2. In a road joint forming mechanism for embedding between adjacent concrete road slabs, a joint base plate beneath the road slabs and spanning the space therebetween, an upright member between the road slabs, means for rigidly securing said upright member to said base plate, said upright member having spaced openings in the lower margin thereof adjacent said base plate, a plurality of spaced pairs of load transmission angle shoes on said base plate with the angle shoes of each pair reversed and staggered with respect to one another and projecting in opposite directions through the openings in said upright member, and anchoring means rigidly secured to each of the angle shoes and comprising upper and lower anchoring arms and a looped anchoring extension connecting said arms and projecting beyond one side of an angle shoe and extending over and seated on a portion of an adjacent angle shoe.

3. A joint former for embedding between adjacent concrete road slabs, said joint former comprising a base plate, a dividing plate supported on said base plate and having a plurality of spaced openings therein, means for rigidly securing the upright plate to said base plate, a plurality of spaced sets of diagonally arranged guide means on said base plate, a plurality of load transmission members having base flanges of adjacent members projecting in opposite directions and transversely disposed on said base plate and slidable in opposite directions through the openings in the upright plate and into said guide means, a plurality of upper and lower anchoring arms on each of said load transmission members, and a looped anchoring means connecting two of said arms and shaped to project to one side of the load transmission member on which it is secured into a position to extend over the base flange of an adjacent load transmission member to guide and hold the same in position.

4. A road joint former for embedding between adjacent concrete road slabs, said road joint former comprising a base plate, a plurality of guides thereon, a dividing member on said base plate and having a plurality of spaced openings therein registering with the guides on said base plate, means for rigidly securing the dividing member to the base plate, a plurality of staggered alternately reversed load transmission members on said base plate projecting in opposite directions through the openings in said dividing member to engage in the guides, and anchoring means on each of said load transmission members, each of said anchoring means comprising a pair of upper anchoring arms, a lower anchoring arm and an anchoring loop integrally connecting one of the upper anchoring arms with the lower anchoring arm and extending into a position to project over a portion of an adjacent load transmission member and resting thereon.

5. A road joint forming mechanism including in combination a load transmitting device comprising an angle-shaped member, a plurality of separated upper and lower anchoring arms rigidly secured thereto, and an anchoring loop integrally connected between the upper and lower anchoring arms and projecting transversely beyond one side of the load transmitting device to rest upon an adjacent load transmitting device.

6. A road joint forming mechanism including in combination a load transmitting device comprising a load transmission shoe, and a continuous anchoring means rigidly secured to the shoe and comprising a plurality of upper anchoring arms, an anchoring loop having one end integral with the outer end of one of said upper anchoring arms, and a lower anchoring arm having the inner end thereof integral with the other end of said anchoring loop.

ROBERT R. ROBERTSON.